US012592653B2

(12) United States Patent

Wang et al.

(10) Patent No.: US 12,592,653 B2
(45) Date of Patent: Mar. 31, 2026

(54) DEPLOYABLE WAVE ENERGY HARVESTING DEVICE FOR AUTONOMOUS UNDERWATER VEHICLES (AUVs)

(71) Applicant: ZHEJIANG UNIVERSITY, Hangzhou (CN)

(72) Inventors: Tao Wang, Hangzhou (CN); Haobin Lv, Hangzhou (CN); Shiqiang Zhu, Hangzhou (CN)

(73) Assignee: Zhejiang University, Hangzhou (CN)

( * ) Notice: Subject to any disclaimer, the term of this patent is extended or adjusted under 35 U.S.C. 154(b) by 750 days.

(21) Appl. No.: 18/153,864

(22) Filed: Jan. 12, 2023

(65) Prior Publication Data

US 2023/0146997 A1 May 11, 2023

(30) Foreign Application Priority Data

Apr. 14, 2022 (CN) .......................... 202210389231.0

(51) Int. Cl.
| | |
|---|---|
| *H02N 2/18* | (2006.01) |
| *B63G 8/00* | (2006.01) |
| *F03B 13/14* | (2006.01) |

(52) U.S. Cl.
CPC ............. *H02N 2/188* (2013.01); *B63G 8/001* (2013.01); *F03B 13/14* (2013.01); *H02N 2/181* (2013.01); *B63G 2008/004* (2013.01)

(58) Field of Classification Search
CPC ........ H02N 2/188; H02N 2/181; B63G 8/001; B63G 2008/004; B63B 2035/4466; B63C 11/52; F03B 13/20; F03B 13/14; Y02E 10/30
See application file for complete search history.

(56) References Cited

U.S. PATENT DOCUMENTS

| | | | | | |
|---|---|---|---|---|---|
| 7,443,046 | B2 * | 10/2008 | Stewart | .................... | F03B 13/20 |
| | | | | | 290/53 |
| 11,286,900 | B2 * | 3/2022 | Zhong | ..................... | B63B 1/048 |
| 11,787,675 | B2 * | 10/2023 | Xu | ......................... | B66F 7/0666 |
| | | | | | 187/211 |
| 2003/0047388 | A1 | 3/2003 | Faitel | | |

(Continued)

FOREIGN PATENT DOCUMENTS

| | | |
|---|---|---|
| CN | 201428545 Y | 3/2010 |
| CN | 205370844 U | 7/2016 |

(Continued)

*Primary Examiner* — Emily P Pham

(57) ABSTRACT

A deployable wave energy harvesting device for autonomous underwater vehicles (AUVs) includes a deployable lifting platform and an energy harvesting mechanism. The deployable lifting platform includes two scissor-type lifting structures, which are supported by a double-end threaded rod. A first stepper motor is connected to a threaded rod passing through a threaded hole at a center of a slotted pin shaft, and drives the threaded rod to lift and lower the deployable lifting platform. A spindle on the energy harvesting mechanism is connected to a generator. A support frame is hung at the end of the spindle. A scissor-type single-pendulum structure is hung at the lower end of the support frame. A load is hung on the end of the scissor-type single-pendulum structure. Second and third stepper motors are installed on the support frame to lift and lower the load by rope drive.

4 Claims, 5 Drawing Sheets

(56) References Cited

U.S. PATENT DOCUMENTS

| 2010/0308589 | A1 | 12/2010 | Rohrer |
| 2019/0113018 | A1 | 4/2019 | Nguyen |

FOREIGN PATENT DOCUMENTS

| CN | 106401849 | B | 12/2017 |
| CN | 113148074 | A | 7/2021 |
| CN | 113236476 | A | 8/2021 |

* cited by examiner

7

10

DEPLOYABLE WAVE ENERGY HARVESTING DEVICE FOR AUTONOMOUS UNDERWATER VEHICLES (AUVs)

CROSS-REFERENCE TO RELATED APPLICATIONS

This application claims the benefit of priority from Chinese Patent Application No. 202210389231.0, filed on Apr. 14, 2022. The content of the aforementioned application, including any intervening amendments thereto, is incorporated herein by reference in its entirety.

TECHNICAL FIELD

This application relates to vibration energy harvesting technologies, and more particularly to a rotary single-pendulum energy harvesting device capable of converting wave energy into electrical energy.

BACKGROUND

Higher and higher requirements have been put forward for the energy of autonomous underwater vehicles (AUVs), and the existing energy storage battery cannot meet the operation needs. Power generation devices for AUVs have been developed, which are generally classified into two categories: resonant power converters and rotary power generation devices. However, they both struggle with large size, inflexible deployment, weak adaptability to waves, and limited energy harvesting efficiency.

SUMMARY

In view of the deficiencies in the prior art, this application provides a rotary single-pendulum energy harvesting device.

Technical solutions of this application are described as follows.

This application provides a deployable wave energy harvesting device for an autonomous underwater vehicle (AUV), including:

a deployable lifting platform; and an energy harvesting mechanism fixedly provided on the deployable lifting platform;

wherein the deployable lifting platform comprises a scissor-type lifting structure; a double-end threaded rod is connected to the scissor-type lifting structure to support the scissor-type lifting structure; and upper and lower ends of the scissor-type lifting structure are each supported by a sheet metal part; a lower end of the deployable lifting platform is provided with a stepper motor seat; a first stepper motor is provided at a side of the stepper motor seat, and the first stepper motor is connected to a threaded rod via a first shaft coupling; the threaded rod passes through a threaded hole at a center of a slotted pin shaft; and the first stepper motor is configured to drive the threaded rod to twist, push and pull the scissor-type lifting structure to lift and lower the deployable lifting platform.

In an embodiment, a spindle on an upper end of the energy harvesting mechanism is mounted on a bearing, and is connected to a generator through a second shaft coupling; a support frame is hung at an end of the spindle; a scissor-type single-pendulum structure is hung at a lower end of the support frame to act as single pendulum, and an alignment structure is provided at the lower end of support frame; a load is hung on an end of the scissor-type single-pendulum structure; a second stepper motor is provided on a first side of the support frame, and a third stepper motor is provided on a second side of the support frame; and the second stepper motor and the third stepper motor are configured to drive the load to move upward and downward by rope drive.

In an embodiment, the deployable wave energy harvesting device further includes a single-chip microcomputer, a drive, a rectifier circuit, a control circuit, a voltage detection module, and a battery;

wherein the battery is configured to power the first stepper motor to drive the deployable lifting platform to move upward or downward according to sea state; the single-chip microcomputer is configured to control the second stepper motor and the third stepper motor to drive the load to move upward or downward to adjust a pendulum length of the scissor-type single-pendulum structure according to sea state; and the rectifier circuit is configured to convert irregular alternating current into direct current and collect the direct current.

In an embodiment, the deployable wave energy harvesting device is installed in the autonomous underwater vehicle; when the autonomous underwater vehicle is about to run out of power, the autonomous underwater vehicle floats to sea surface, and the battery powers the deployable wave energy harvesting device; simultaneously, a hatch cover is opened, and the first stepper motor is driven to lift the deployable lifting platform; and the voltage detection module is configured to detect a voltage amplitude after rectification and feed the voltage amplitude back to the single-chip microcomputer; and when a voltage generated by the generator reaches the voltage amplitude, the battery stops supplying power to the deployable wave energy harvesting device.

In an embodiment, a motor shaft of the second stepper motor is connected to a motor shaft of the third stepper motor via a third shaft coupling; when collecting electricity, the second stepper motor and the third stepper motor are controlled by a single-chip microcomputer to rotate in the same direction simultaneously to drive the load to move upward or downward by rope drive; and when power is off, a pendulum length is fixed according to a positioning torque of the second stepper motor and the third stepper motor to prevent the load from falling under the action of its gravity.

Compared to the prior art, this application has the following beneficial effects.

According to the relationship between the pendulum length and the resonance frequency of the rotary single-pendulum power generation device, and the flexibility of the scissor-type mechanical mechanism, the height of the lifting platform and the length of the single pendulum can be adjusted, so that more wave energy can be harvested under different sea states at less space occupation. The wave energy harvesting device provided herein has a stable, deployable, flexible structure, small space occupation when folded and strong adaptability to waves.

Figure 1:
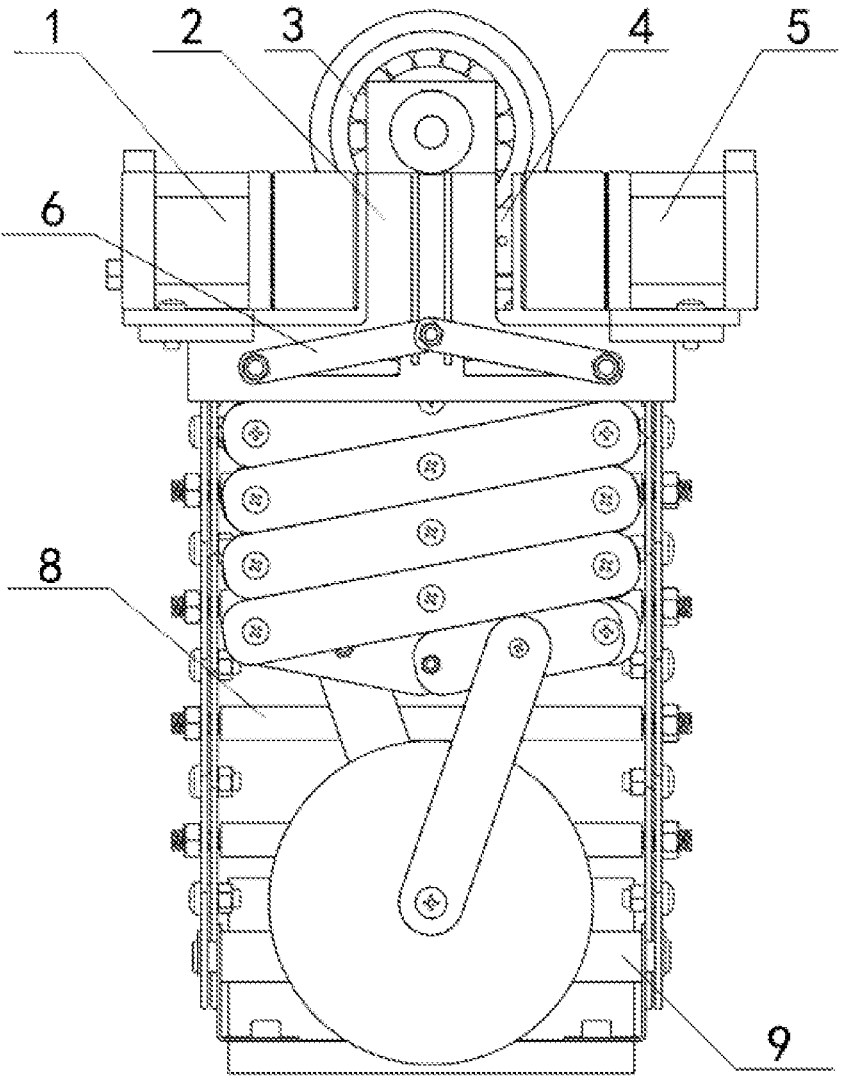
FIG. 1 is a front view of a deployable wave energy harvesting device according to one embodiment of the present disclosure.
Figure 2:
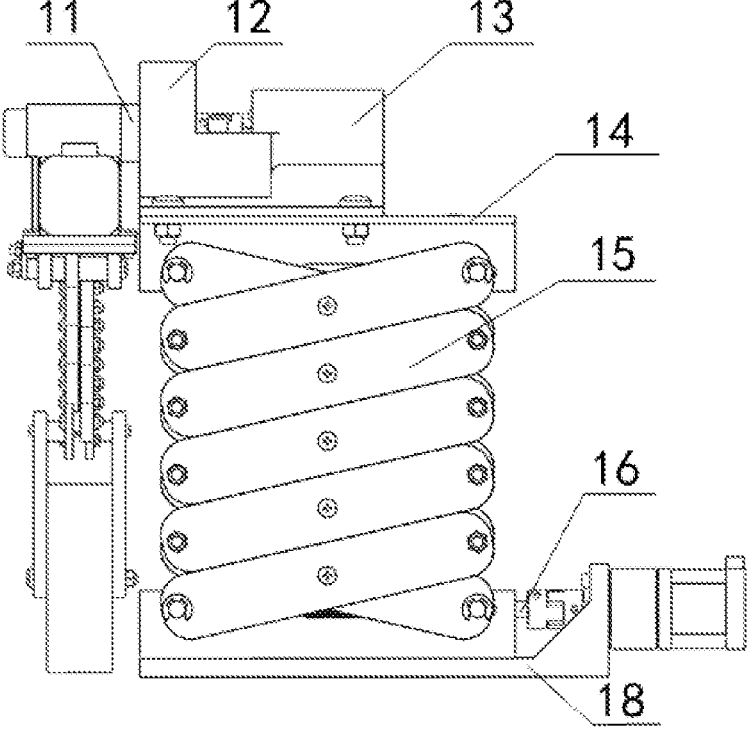
FIG. 2 is a side view of the deployable wave energy harvesting device according to one embodiment of the present disclosure.
Figure 3:
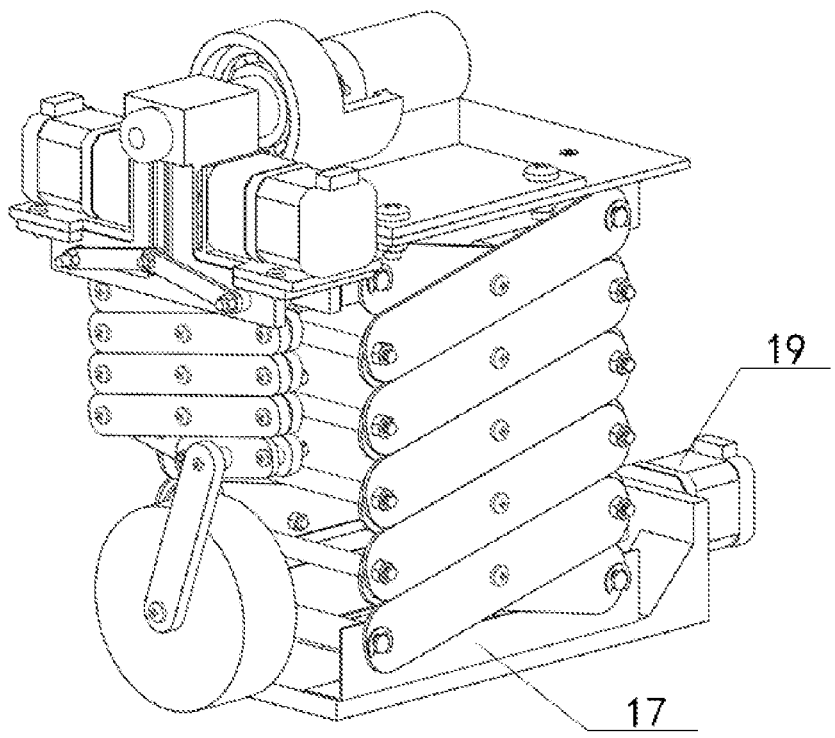
FIG. 3 is a perspective view of the deployable wave energy harvesting device according to one embodiment of the present disclosure.
Figure 4:
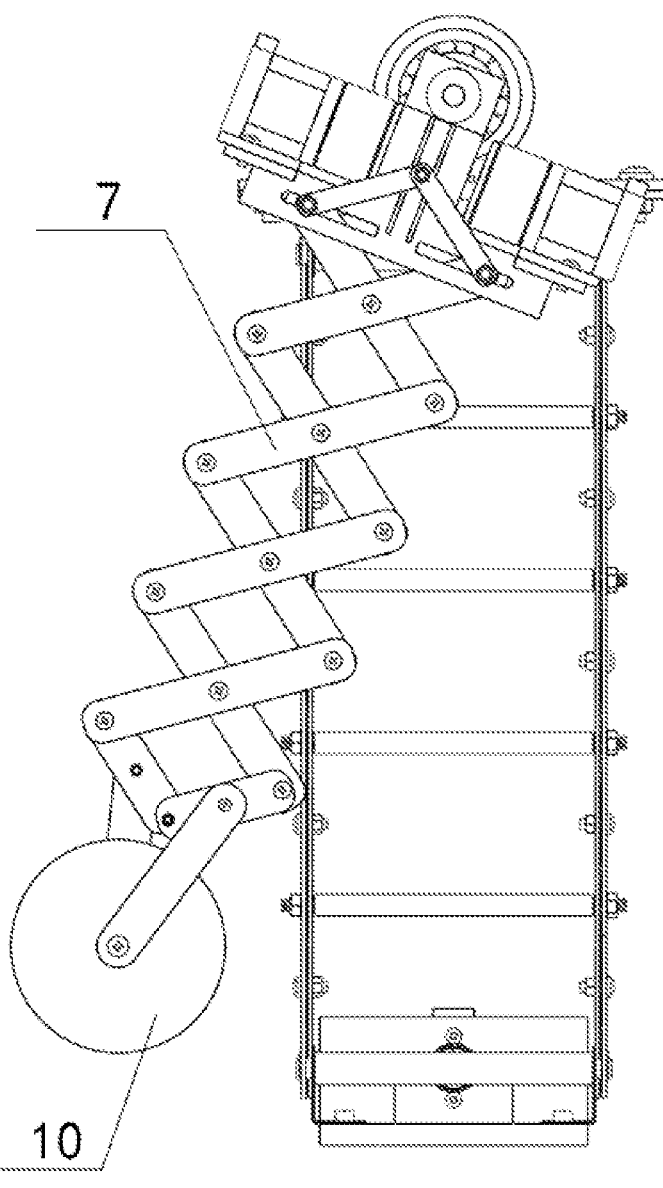
FIG. 4 is a front view showing the deployable wave energy harvesting device according to one embodiment of the present disclosure in an operation state.

In the figures: 1—second stepper motor; 2—support frame; 3—bearing; 4—third shaft coupling; 5—third stepper motor; 6—alignment structure; 7—scissor-type single-pendulum structure; 8—double-end threaded rod; 9—slotted pin shaft; 10—load; 11—spindle; 12—bearing seat; 13—generator; 14—platform plane; 15—scissor-type lifting structure; 16—threaded rod; 17—sheet metal part; 18—stepper motor seat; and 19—first stepper motor.

DETAILED DESCRIPTION OF EMBODIMENTS

The disclosure will be further described in detail in conjunction with the embodiments and the accompanying drawings.

A deployable wave energy harvesting device provided herein for autonomous underwater vehicles (AUVs) includes a deployable lifting platform and an energy harvesting mechanism installed thereon. The deployable lifting platform includes a scissor-type lifting structure, a double-end threaded rod is connected to the scissor-type lifting structure to support the scissor-type lifting structure, and upper and lower ends of the scissor-type lifting structure are each supported by a sheet metal part. An upper end of the deployable lifting platform is provided with a platform plane, and a lower end of the deployable lifting platform is provided with a stepper motor seat. A first stepper motor is provided at a side of the stepper motor seat, and the first stepper motor is connected to a threaded rod via a first shaft coupling. The threaded rod passes through a threaded hole in a center of a slotted pin shaft, and the first stepper motor is configured to drive the threaded rod to twist, push and pull the scissor-type lifting structure to lift and lower the deployable lifting platform.

A spindle on an upper end of the energy harvesting mechanism is mounted on a bearing and connected to a generator through a second shaft coupling. A support frame is hung at an end of the spindle. A scissor-type single-pendulum structure is hung at a lower end of the support frame to realize a single pendulum, and an alignment structure is provided on the scissor-type single-pendulum structure. A load is hung on the end of the scissor-type single-pendulum structure. A second stepper motor is provided on a first side of the support frame, and a third stepper motor is provided on a second side of the support frame, thereby lifting or lowering the load by rope drive. The wave energy harvesting mechanism adopts scissor mechanical structure, which is stable, deployable, flexible, and has small occupation when folded and strong adaptability to waves.

In this embodiment, a rotary single-pendulum energy harvesting device is shown in FIGS. 1-4.

In this embodiment, the wave energy harvesting device includes the deployable lifting platform. The deployable lifting platform includes two scissor-type lifting structures 15, the double-end threaded rod 8 is connected to two scissor-type lifting structure 15 to support two scissor-type lifting structures 15, and upper and lower ends of each of two scissor-type lifting structures 15 are each supported by the sheet metal part 17. The upper end of the deployable lifting platform is provided with the platform plane 14, and the lower end of the deployable lifting platform is provided with the stepper motor seat 18. The first stepper motor 19 is provided at the side of the stepper motor seat 18, and the first stepper motor 19 is connected to the threaded rod 16 by the first shaft coupling. The threaded rod 16 passes through the threaded hole in the center of the slotted pin shaft 9, and the first stepper motor 19 drives the threaded rod 16 to twist, push and pull the scissor-type lifting structure 15 to lift and lower the deployable lifting platform.

In this embodiment, the wave energy harvesting device includes the energy harvesting mechanism fixedly provided on the deployable lifting platform. The spindle 11 on the upper end of the energy harvesting mechanism is mounted on the bearing 3, and the bearing 3 is disposed on the bearing seat 12. The spindle 11 is connected to the generator 13 through the second shaft coupling. The support frame 2 is hung at the end of the spindle 11. The scissor-type single-pendulum structure 7 is hung at the lower end of the support frame 2 to realize a single pendulum. The alignment structure 6 is provided on the scissor-type single-pendulum structure 7. The load 10 is hung on the end of the support frame 2. The second stepper motor 1 is provided on a first side of the support frame 2, and the third stepper motor 5 is provided on a second side of the support frame 2 to lift and lower the load 10 by rope drive.

The working principle of the deployable wave energy harvesting device for AUVs is described as follows.

The deployable wave energy harvesting device is installed in the autonomous underwater vehicle (cabin diameter of 400 mm), and the bottom end of the deployable lifting platform can be fixed with the autonomous underwater vehicle.

Figure 5:
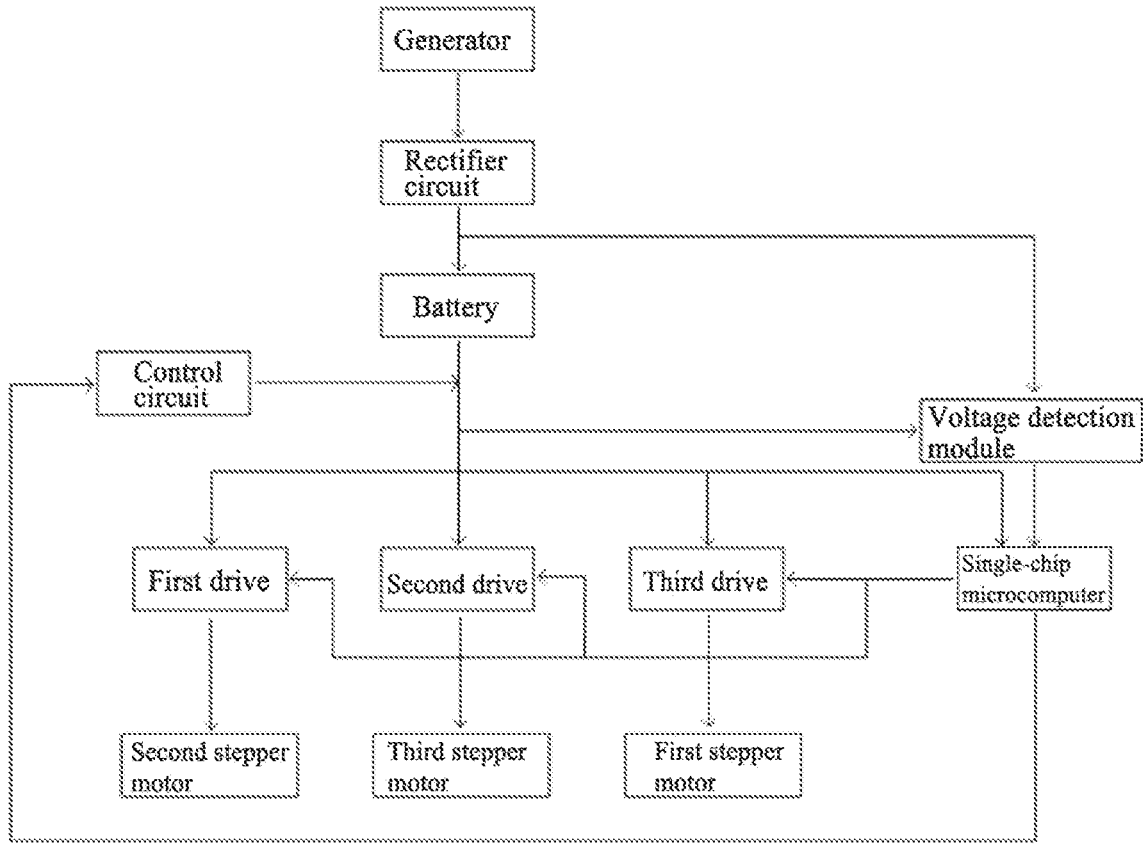
FIG. 5 schematically shows the power supply control of the deployable wave energy harvesting device according to one embodiment of the present disclosure.

FIG. 5 shows the power supply control flow for the entire device. When the autonomous underwater vehicle is about to run out of power, the autonomous underwater vehicle will float on the sea surface, and the battery will power the entire device. At this time, a hatch cover will be opened, and the first stepper motor 19 drive to lift the deployable lifting platform. When collecting electricity, the single-chip microcomputer controls the second stepper motor 1 and the third stepper motor 5 installed on both sides of the support frame 2 to rotate in the same direction at the same time, and the load 10 is driven to move upward or downward by rope drive to adjust the pendulum length. The voltage detection module will detect the voltage amplitude after rectification and feed the voltage amplitude back to the single-chip microcomputer. When the voltage generated by the generator reaches the voltage amplitude, the battery will stop supplying power to the entire autonomous underwater vehicle. When the power is cut off, the pendulum length is fixed according to the positioning torque of the second stepper motor 1 and the third stepper motor 5 to prevent the load 10 from falling automatically by own gravity.

Described above is merely one embodiment of the disclosure, which is not intended to limit the disclosure. It should be understood that any modifications, replacements and variations made by those skilled in the art without departing from the spirit of the disclosure should fall within the scope of the disclosure defined by the appended claims.

What is claimed is:

1. A deployable wave energy harvesting device for an autonomous underwater vehicle (AUV), comprising:

a deployable lifting platform; and an energy harvesting mechanism fixedly provided on the deployable lifting platform;

wherein the deployable lifting platform comprises a scissor-type lifting structure; a double-end threaded rod is connected to the scissor-type lifting structure to support the scissor-type lifting structure; and upper and lower ends of the scissor-type lifting structure are each supported by a sheet metal part; a lower end of the deployable lifting platform is provided with a stepper motor seat; a first stepper motor is provided at a side of the stepper motor seat, and the first stepper motor is connected to a threaded rod via a first shaft coupling; the threaded rod passes through a threaded hole at a center of a slotted pin shaft; and the first stepper motor is configured to drive the threaded rod to twist, push and pull the scissor-type lifting structure to lift and lower the deployable lifting platform; and a spindle on an upper end of the energy harvesting mechanism is mounted on a bearing, and is connected to a generator through a second shaft coupling; a support frame is hung at an end of the spindle; a scissor-type single-pendulum structure is hung at a lower end of the support frame to act as single pendulum, and an alignment structure is provided at the lower end of the support frame; a load is hung on an end of the scissor-type single-pendulum structure; a second stepper motor is provided on a first side of the support frame, and a third stepper motor is provided on a second side of the support frame; and the second stepper motor and the third stepper motor are configured to drive the load to move upward and downward by rope drive.

2. The deployable wave energy harvesting device of claim 1, further comprising:

a single-chip microcomputer;

a drive;

a rectifier circuit;

a control circuit;

a voltage detection module; and a battery;

wherein the battery is configured to power the first stepper motor to drive the deployable lifting platform to move upward or downward according to sea state; the single-chip microcomputer is configured to control the second stepper motor and the third stepper motor to drive the load to move upward or downward to adjust a pendulum length of the scissor-type single-pendulum structure according to sea state; and the rectifier circuit is configured to convert irregular alternating current into direct current and collect the direct current.

3. The deployable wave energy harvesting device of claim 2, wherein the deployable wave energy harvesting device is installed in the autonomous underwater vehicle; when the autonomous underwater vehicle is about to run out of power, the autonomous underwater vehicle floats to sea surface, and the battery powers the deployable wave energy harvesting device; simultaneously, a hatch cover is opened, and the first stepper motor is driven to lift the deployable lifting platform; and the voltage detection module is configured to detect a voltage amplitude after rectification and feed back the voltage amplitude to the single-chip microcomputer; and when a voltage generated by the generator reaches the voltage amplitude, the battery stops supplying power to the deployable wave energy harvesting device.

4. The deployable wave energy harvesting device of claim 1, wherein a motor shaft of the second stepper motor is connected to a motor shaft of the third stepper motor via a third shaft coupling; when collecting electricity, the second stepper motor and the third stepper motor are controlled by a single-chip microcomputer to rotate in the same direction simultaneously to drive the load to move upward or downward by rope drive; and when power is off, a pendulum length is fixed according to a positioning torque of the second stepper motor and the third stepper motor to prevent the load from falling under the action of its gravity.

* * * * *